United States Patent [19]

Shiibayashi et al.

[11] Patent Number: 4,696,629
[45] Date of Patent: Sep. 29, 1987

[54] HERMETIC SCROLL COMPRESSOR WITH WELDED CASING SECTION

[75] Inventors: Masao Shiibayashi; Akira Murayama, both of Shimizu, Japan

[73] Assignee: Hitachi, Ltd., Tokyo, Japan

[21] Appl. No.: 894,865

[22] Filed: Aug. 8, 1986

[30] Foreign Application Priority Data

Aug. 16, 1985 [JP] Japan .................................. 60-179414

[51] Int. Cl.⁴ ......................... F04C 18/04; F04B 39/12
[52] U.S. Cl. ....................................... 418/55; 417/902; 29/156.4 R
[58] Field of Search ........................... 418/55; 417/902; 29/156.4 R

[56] References Cited

U.S. PATENT DOCUMENTS

| | | | |
|---|---|---|---|
| 4,365,941 | 12/1982 | Tojo et al. | 418/55 |
| 4,518,324 | 5/1985 | Mizuno et al. | 418/55 |
| 4,545,747 | 10/1985 | Tamura et al. | 418/55 |
| 4,551,082 | 11/1985 | Hazaki et al. | 418/55 |

*Primary Examiner*—John J. Vrablik
*Attorney, Agent, or Firm*—Antonelli, Terry & Wands

[57] ABSTRACT

A hermetic scroll compressor has a scroll compressor section, a motor section and a hermetic casing which encases the compressor and motor sections. The space in the casing is divided into an upper chamber and a lower chamber by a frame by which a shaft interconnecting the compressor and motor sections is rotatably supported. The upper and lower chambers are communicated with each other through a communication passage which is formed in the outer periphery of the frame. The hermetic casing is composed of an upper section, a barrel section and a lower section which are welded together. The barrel section is formed by rolling a sheet into a cylindrical form and welding opposing ends of the rolled sheet so as to form a weld seam joint. The frame is fixed in the casing with the weld seam joint disposed within the circumferential width of the communication passage, so that the outer periphery of the frame is in tight contact with the inner periphery of the barrel section except for the portion where the communication passage is formed.

4 Claims, 10 Drawing Figures

--- FLOW OF OIL
— FLOW OF GAS

HERMETIC SCROLL COMPRESSOR WITH WELDED CASING SECTION

BACKGROUND OF THE INVENTION

The present invention relates to a hermetic scroll compressor which is suitable for use as a refrigerant compressor in an air conditioning system or as a compressor for compressing helium gas. More particularly, the invention is concerned with a hermetic scroll compressor having a hermetic casing which has oil separating function.

The specification of U.S. Pat. No. 4,545,747 discloses a hermetic scroll compressor having a motor-driven scroll compressor section encased by a hermetic casing, particularly an improved construction of the hermetic casing. In this hermetic scroll compressor, a motor-compressor unit constituted by an electric motor and a scroll compressor which are assembled together in a unit is encased by the hermetic casing which is composed of three sections, namely, an upper casing section, a barrel section and a lower casing section. The motor-compressor unit is mounted on a frame which is secured in the casing seemingly in close contact with the inner surface of the casing wall. More specifically, as shown in FIG. 8, the outer periphery 11m of the frame 11 is shrink-fitted in the inner periphery of the barrel section 1b of the casing. The barrel section 1b of the casing is formed by rolling a thin sheet material into a cylindrical form and welding the opposing ends of the thus rolled material by electric arc welding so as to form a weld joint.

As will be seen form FIG. 9, the weld seam joint 1m has a portion formed to project inwardly from the casing as at 1m'. This projection 1m' provides an essential thickness for attaining the required strength of the weld joint. During the welding, portions of the casing on both side of the weld seam joint 1m are deformed under the influence of the projection 1m' so that small clearances are formed as at 11p, 11q between these portions of the casing and the outer peripheral surface 11m of the frame 11. These clearances extend in the axial direction of the casing over the length of the barrel section 1b of the casing. Thus, the weld seam joint 1m forms a step on the inner surface of the barrel section 1b as shown in FIG. 9. Accordingly, a discharge chamber and a motor chamber, which are partitioned by the frame, are communicated with each other not only through a designed communication passage 18 but also through these clearances, thus impairing the seal between these two chambers.

In the case where a discharge pipe 19 is connected by welding to the portion of the barrel section 1b near the weld seam joint 1m, the sizes of the clearances 11p, 11q are increased due to heat applied to the barrel section during welding.

The communication passage 18 constituted by passage portions 18a and 18b (see FIG. 10) is provided intentionally for the purpose of allowing refrigerant gas and oil to pass therethrough. However, the oil leaks from the upper discharge chamber 2a into the lower chamber 2b through the clearances 11p, 11q around the weld seam joint 1m. oil leaking through the clearances 11p, 11q directly flows in the discharge side. In particular, when the weld seam joint 1m is disposed in the vicinity of the discharge pipe 19 as shown in FIG. 9, the oil leaking through the clearances 11p, 11q can easily reach the discharge pipe 19. The oil is then discharged directly to the outside of the compressor, as shown by broken-line arrows in FIG. 10. The designed circulation of the oil in the compressor is not described herein because it does not constitute any critical portion of the invention.

In the operation of the compressor described above, the oil is introduced together with the refrigerant gas from the upper discharge chamber 2a into the lower chamber 2b through the communication passage portions 18a, 18b. Since the lower chamber 2b has an ample volume, the gas suspending the oil is expanded and decelerated therein so that the oil suspended by the gas is separated from the latter. The oil separation efficiency of the casing, however, is impaired considerably, when the aforementioned clearances 11p, 11q are disposed in the vicinity of the discharge pipe 19, or when the same are located circumferentially intermediate between the communication passage portions 18a, 18b and the discharge pipe 19. The reason for this is that in such a case a significant portion of the oil is conveyed to the outside of the compressor without being separated from the gas. The rate of leak of the oil through the clearances 11p, 11q is increased in proportion to an increase in the pressure differential between the upper discharge chamber 2a and the lower chamber 2b, so that the rate of convey of the oil to the outside of the casing is increased as the scroll compressor is driven at high speed by an inverter. In addition, the sizes of the clearances 11p, 11q are not constant but vary depending on the amount of thermal deformation of the casing during the welding. This means that different compressors exhibit different rates of convey of oil to the outside of the compressors through the clearances.

Thus, the clearances formed on both sides of the weld seam joint impaires the oil separating efficiency of a hermetic scroll compressor and causes fluctuation of rate of convey of the oil to the outside of the compressor. The elimination of leak of oil through these clearances, therefore, is a serious problem also from the view point of the product quality control.

SUMMARY OF THE INVENTION

Accordingly, an object of the invention is to provide an improved hermetic scroll compressor having a casing in which the formation of clearances between the outer periphery of a frame and the inner periphery of the casing wall is avoided to prevent formation of oil passage other than the designed communication passage, thus ensuring a high oil separating efficiency so as to minimize the rate of convey of the oil to the outside of the compressor.

To this end, according to the invention, there is provided a hermetic scroll compressor having a hermetic casing, wherein a weld seam joint of a barrel section of the casing, forming a step on an inner peripheral surface of the barrel section, is positioned within a designed communication passage which is formed in an outer peripheral surface of a frame for providing communication between upper discharge and lower chambers in the casing, so that the outer peripheral surface of the frame tightly fits in an inner periphery of the casing except for a portion where the designed communication passage exists, thereby eliminating any clearance which would allow oil to leak therethrough except for the designed communication passage.

In operation, the oil suspended by compressed gas discharged into an upper discharge chamber of the casing is made to flow together with the gas into a lower chamber of the casing only through the designed communication passage. The gas suspending the oil, therefore, is spread over the entire area around a motor so as to contact with an outer surface of the motor and the inner peripheral surface of the casing, thus ensuring high oil separating efficiency, as well as high effect of cooling of the motor. In consequence, the rate of convey of the oil to the outside of the compressor is minimized. In addition, all the compressors manufactured each exhibit the same rate of convey of the oil to the outside of the compressor, thus ensuring high reliability of the hermetic scroll compressors as the products.

The above and other objects, features and advantages of the invention will become clear from the following description of the preferred embodiments taken in conjunction with the accompanying drawings.

BRIEF DESCRIPTION OF THE DRAWINGS

FIG. 8 is a cross-sectional view of the hermetic scroll compressor; FIG. 9 is a fragmentary sectional view of a portion of the hermetic scroll compressor shown in FIG. 9, showing particularly the weld seam joint of the barrel section of the casing; and FIG. 10 is a fragmentary vertical sectional view illustrating the state of leak of oil through a region on the outer periphery of the frame.

DETAILED DESCRIPTION OF PREFERRED EMBODIMENTS

Preferred embodiments of the invention will be described hereinunder with reference to the accompanying drawings.

Figure 1:
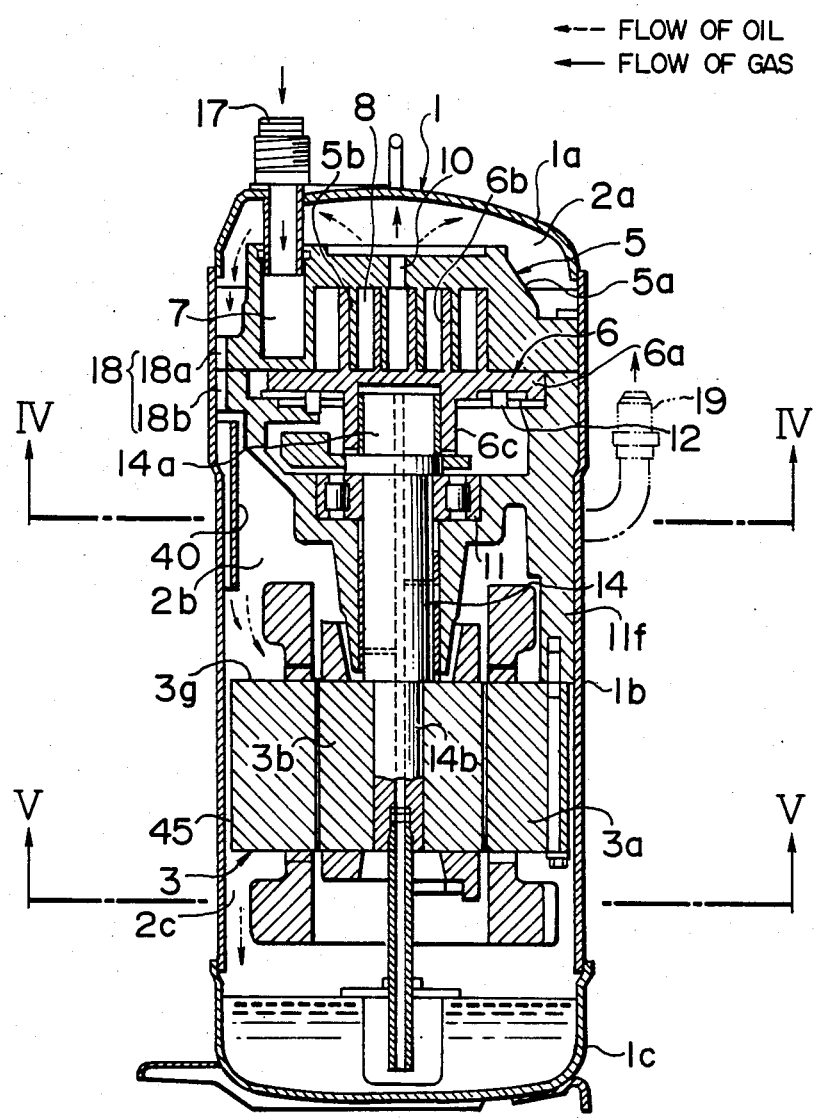
FIG. 1 is a vertical sectional view of the hermetic scroll compressor in accordance with an embodiment of the invention.

FIG. 1 shows the whole structure of a first embodiment of the hermetic scroll compressor in accordance with the invention. The hermetic scroll compressor has a hermetic casing generally designated by a numeral 1, and a motor-compressor unit encased by the casing 1. The motor-compressor unit is composed of a scroll compressor section disposed on the upper side of the casing 1 and an electric motor section for driving the compressor disposed on the lower side of the casing 1. The motor-compressor unit is carried by a latermentioned frame which divides the space in the casing 1 into an upper discharge chamber 2a and a lower chamber 2b.

The compressor section has a stationary scroll member 5 and an orbiting scroll member 6 which are assembled together to define compression chambers 8 for refrigerant therebetween. More specifically, the stationary scroll member 5 has a disk-shaped end plate 5a and a wrap 5b which protrudes upright from one side of the end plate 5a and is formed along an involute curve or a curve similar to an involute curve. A discharge port 10 and a suction port 7 are formed in a central portion and a peripheral portion of the end plate 5a, respectively. On the other hand, the orbiting scroll member 6 has an end plate 6a, a wrap 6b protruding upright from one side of the end plate 6a and having the same form as the wrap 5b of the stationary scroll member 5, and a boss 6c formed on the opposite side of the end plate to the wrap 6b. The frame mentioned above, denoted by a numeral 11, has a central portion formed as a bearing portion which rotatably supports a rotary shaft 14. The rotary shaft 14 is provided on one end thereof with an eccentric pin 14a which is rotatably received in a bore formed in the boss 6c of the orbiting scroll member 6. The stationary scroll member 5 is fixed to the frame 11 by means of a plurality of bolts, while the orbiting scroll member 6 is carried by the frame 11 through an Oldham's mechanism 12, so that the orbiting scroll member 6 can make orbiting motion with respect to the stationary scroll member 5 without rotating about its own axis. The lower end portion of the rotary shaft 14 constitutes a motor shaft 14b on which the rotor 3b of a motor is fixedly mounted and through which the motor section is directly coupled to the compressor section. A vertical suction pipe 17 is connected to the suction port 7 of the stationary scroll member 5 through the wall of the hermetic casing 1. The discharge port 10 of the scroll compressor opens to the upper discharge chamber 2a which in turn communicates with the lower chamber 2b through passages 18a, 18b and a discharge passage guide 40. The lower chamber 2b communicates with an under-motor chamber 2c through an annular passage 45 formed between the stator 3a of the motor and the wall of the hermetic casing 1. A discharge pipe 19 is connected to a barrel section of the casing 1 so as to communicate with the lower chamber 2b.

The motor 3 is mounted at its stator on the frame through a motor seat portion 11f. The discharge passage guide 40 is intended for directly guiding the refrigerant gas suspending oil to the motor 3, in order to enhance the effect of cooling the motor 3.

FIGS. 2 to 5 in combination show the positional relationship between a weld seam joint 1n of a barrel section 1b of the casing 1 and internal parts of the compressor such as the frame 11 having the communication passage 18b, stator 3a of the motor 3, and so forth.

Figure 2:
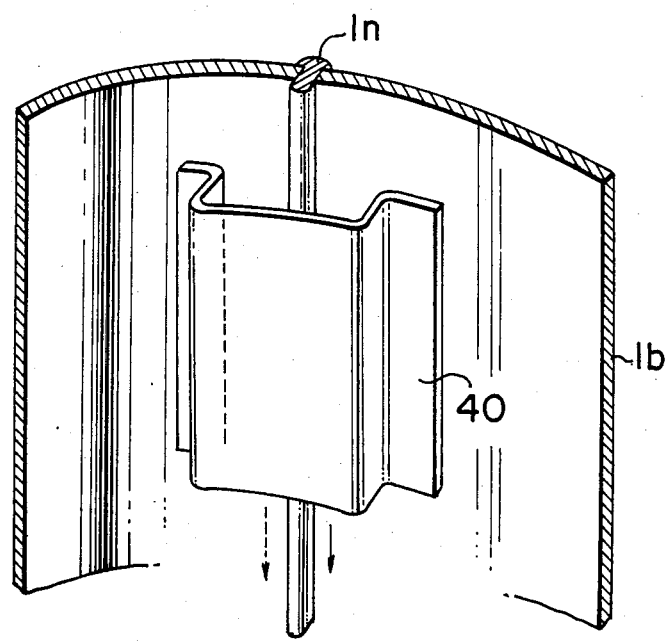
FIG. 2 is an enlarged perspective view of a portion of a barrel section of a hermetic casing of the hermetic scroll compressor of FIG. 1, showing particularly a weld seam joint of the barrel section and a passage guide portion.
Figure 3:
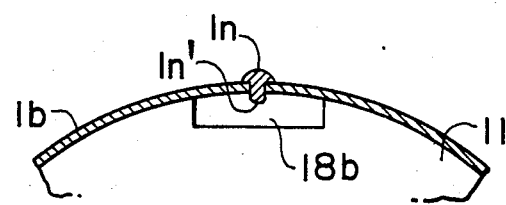
FIG. 3 is a fragmentary cross-sectional view of the barrel section of the compressor shown in FIG. 1, showing particularly the weld seam joint of the barrel section and a communication passage formed in an outer peripheral surface of a frame.

Referring to FIGS. 2 and 3, the weld seam joint 1n is circumferentially located such that it is aligned with both the discharge passage guide 40 and the communication passage 18b formed in the outer peripheral surface of the frame 11. The guide 40 and the passage 18b are inherently designed to constitute a passage for the mixture of the refrigerant gas and the oil which is intended for lubrication and cooling in the compressor. Although the step 1n' projecting inwardly from the weld seam joint 1n is received in the spaces defined by the guide 40 and the passage 18b, this step does not at all hinder the flow of the mixture of the refrigerant gas and oil.

Figure 4:
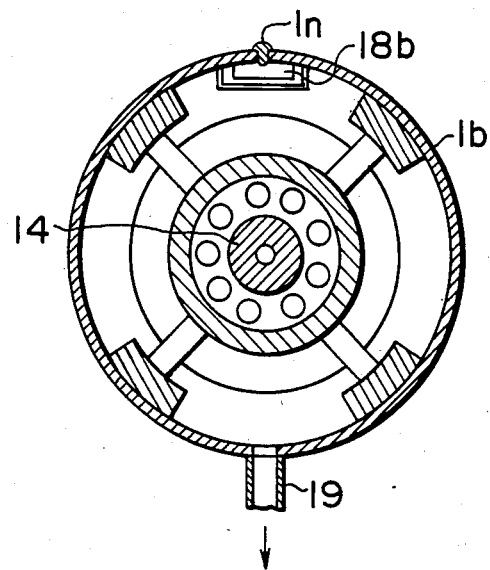
FIG. 4 is a cross-sectional view taken along the line IV—IV of FIG. 1.
Figure 5:
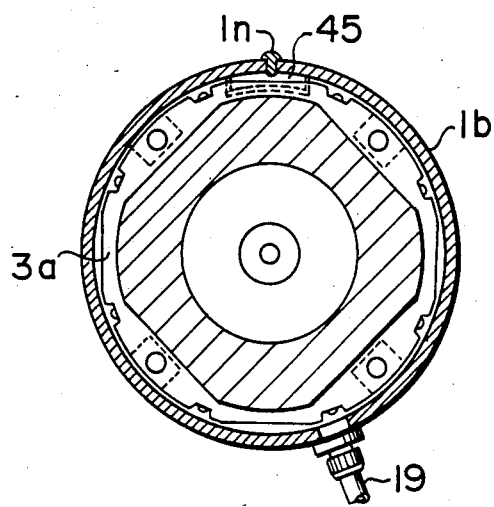
FIG. 5 is a sectional view taken along the line V—V of FIG. 1.

The step 1n' projecting inwardly from the weld seam joint 1n does not interfere with internal members such as the stationary scroll member 5, frame 11, stator of the electric motor 3 and so forth. Namely, the step 1n' is received in the axial spaces within the passage 18 formed in the outer peripheral surfaces of the stationary scroll member 5 and the frame 11 and within the annular passage 45 defined around the stator 3a of the motor 3, as shown in FIGS. 4 and 5 respectively, so as to be spaced apart from the internal members of the compressor. Thus, the compressor can be assembled without any difficulty even if the step 1n' is left unremoved. In the conventional hermetic scroll compressors, the step of the weld seam joint undesirably interferes with the outer peripheral surface of the frame 11, so that a troublesome work is required for the removal of the step of the weld joint, particularly when the step has a large height. It will be seen that the hermetic scroll compressor in accordance with the invention offers advantages over the prior art also in the aspects of the fabrication and assembly of the compressor, i.e., a reduction in the number of manufacturing steps which in turn contributes to a reduction in the production cost.

In the described embodiment, as shown in FIGS. 4 and 5, the discharge pipe 19 through which the gas is delivered is connected to the barrel section 1b at a position substantially diametrically opposing to the weld seam joint 1n. This arrangement maximizes the length of the path of the gas and oil between the passage system such as the passages 18a, 18b and 45 and the discharge pipe 19, thus assuring long period of stay of the gas and oil within the hermetic casing, thereby attaining the highest effect of separation of oil from the refrigerant gas.

As described before, the space in the hermetic casing 1 is divided into two chambers by means of the frame 11. According to the invention, the clearances which are inevitably formed in the conventional compressors due to the presence of the step of the weld seam joint of the barrel section are eliminated by the arrangement in which the step is located within the circumferential width of the designed passage 18. Thus, a tight seal which prevents the flow of the gas and the oil from the upper discharge chamber 2a and the lower chamber 2b is securely formed between the frame 11 and the casing 1 except for the portion where the designed passage 18 is provided, so that the gas and the oil can reach the discharge pipe 19 only through the designed communication passage 18 and the lower chamber 2b. The tight seal on the outer periphery of the frame 11 is established by forcibly fitting the motor-compressor unit with the frame into the barrel section 1b of the casing.

Although the invention has been described in reference to the embodiment which has the casing with the barrel section 1b formed by rolling a sheet into a cylindrical shape or with the barrel structure of a rolled up sheet, this is not exclusive. The invention can be applied also to any case where the barrel section of a casing is formed to have a structure other than the above-mentioned barrel structure of a rolled up sheet. In such a case, also by making the outer periphery of a frame tightly contact with a hermetic casing except for a designed passage, the oil separating efficiency of the compressor is enhanced, thereby reducing the amount of oil conveyed to the outside of the compressor.

Figure 6:
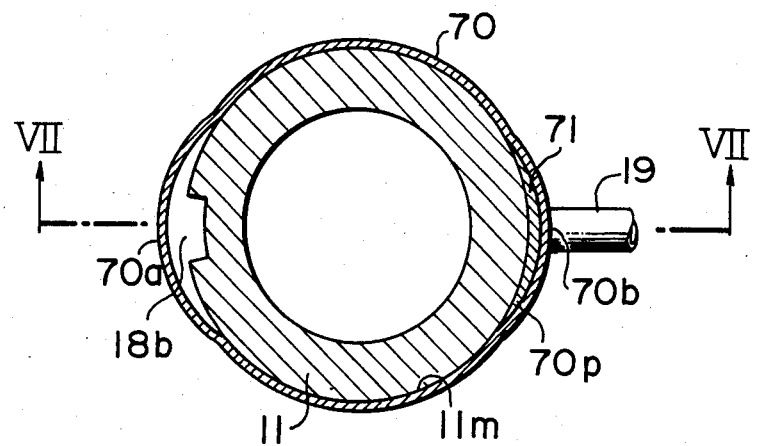
FIG. 6 is a fragmentary sectional view of a modification of the embodiment shown in FIG. 1.
Figure 7:
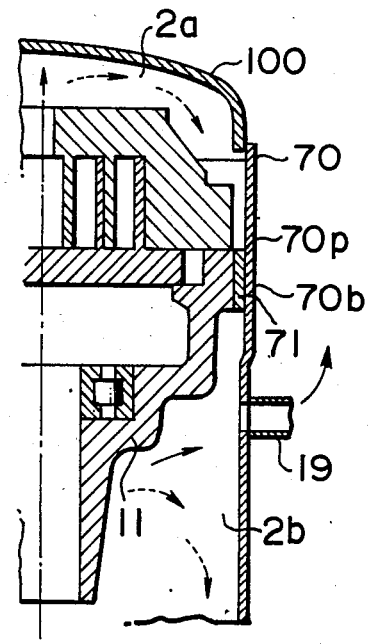
FIG. 7 is a vertical sectional view taken along the line VII—VII of FIG. 6.
Figure 8:
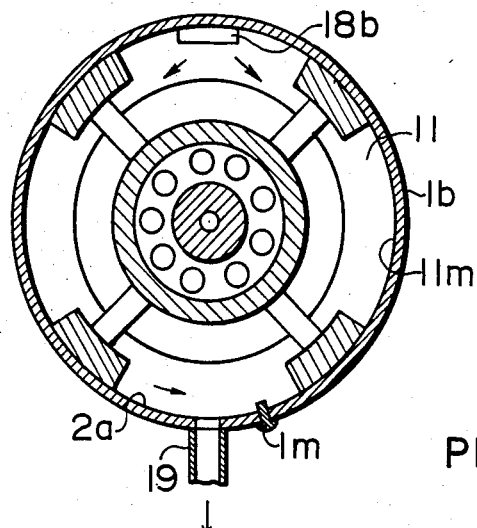
FIGS. 8 to 10 show a conventional hermetic scroll compressor.
Figure 9:
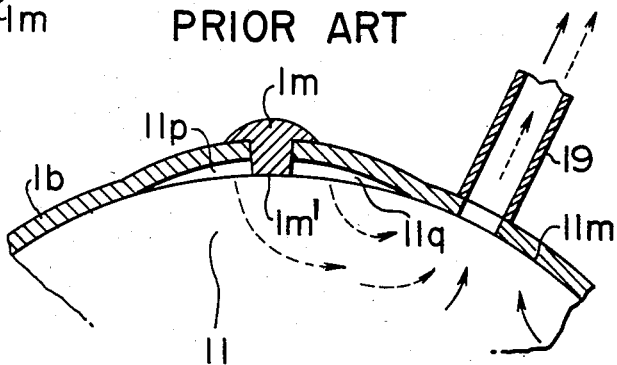
Figure 10:
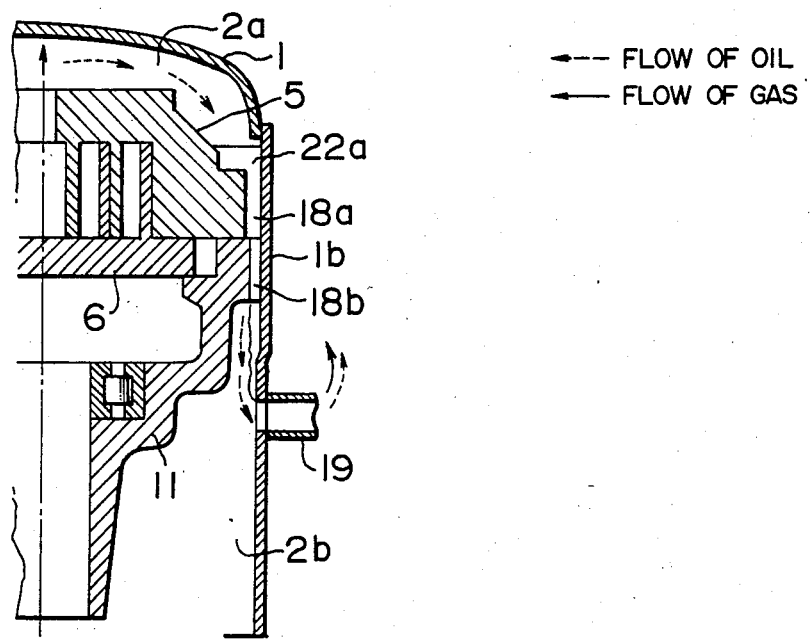

In FIGS. 6 and 7, another hermetic scroll compressor is shown as a modification of the described embodiment. The compressor has a hermetic casing 100 with a barrel section 70 made from a seamless steel pipe, thus forming a so-called seamless chamber. The barrel section 70, however, has a slightly oval cross-section as shown in a somewhat exaggerated manner in FIG. 6. In this modification, the barrel section is arranged in such a manner that the communication passage 18b of the frame 11 is circumferentially aligned with one 70a of two diametrically opposing bulges of the barrel section while the other bulge 70b is connected with the discharge pipe 19, as will be clearly seen from FIG. 6. In addition, a clearance 70p formed outside the outer periphery 11m of the frame 11 on the discharge pipe side is filled with a heat-resistant resin 71 such as a silicon rubber which is resistant to refrigerant, so as to ensure the sealing of the upper discharge chamber 2a from the lower chamber 2b.

According to the described modification, any other space formed between the outer peripheral surface 11m of the frame 11 and the inner peripheral surface of the wall of the barrel section than the communication passage 18b is filled with an anti-refrigerant and heat-resistant resin 71.

Thus, the invention makes it possible to eliminate undesirable effect on the oil separation efficiency of a compressor, which effect is produced by the deformation of the barrel section of the hermetic casing.

Consequently, the fluctuation in oil separating efficiency among compressors can be reduced so as to assure a higher reliability and quality of the hermetic scroll compressors as products. It is to be understood also that the mixture of the refrigerant gas and the oil is distributed over the entire area around the electric motor so as to effectively cool the latter, unlike the conventional compressor in which not a small part of the oil flows from the upper discharge chamber in the hermetic casing directly to the discharge pipe through clearances formed around the frame other than the designed passage without contacting the electric motor.

The arrangement proposed by the invention, i.e., the positioning of the step of a weld seam joint within the circumferential width of a designed passage, may attain not only the prevention of a direct flow of gas and oil to the outside of a compressor but also the facilitation of the assembly of the hermetic scroll compressor.

What is claimed is:

1. A hermetic scroll compressor comprising a hermetic casing, a scroll compressor section and an electric motor section both contained in said hermetic casing, said scroll compressor and motor sections being connected with each other through a rotary shaft supported by a frame, a space in said hermetic casing being separated into upper and lower chambers by said frame, said compressor section including stationary and orbiting scroll members each having a disk-shaped end plate and a spiral wrap protruding upright therefrom and assembled together with their wraps meshing inwardly with each other to define compression chambers therebetween, said orbiting scroll member being operably engaged by an eccentric shaft portion formed on said rotary shaft and being provided with rotation prevention means, said stationary scroll member being formed in its end plate with a discharge port opening through a central portion of the end plate and a suction port opening through a peripheral portion thereof, said orbiting scroll member being driven in orbital motion relative to said stationary scroll member without rotation about its own axis to move said compression chambers toward center of both scroll members with capacity of said compression chambers progressively decreased so that a refrigerant gas drawn through said suction port into said compression chambers is compressed, discharged through said discharge port to said upper chamber and introduced therefrom through a communication passage formed in a peripheral portion of said frame to said lower chamber, in which said electric motor section is disposed, to be delivered to outside of said compressor through a discharge pipe, wherein said hermetic casing has an upper casing section, barrel section and a lower casing section which are formed separately and hermetically welded together, said barrel section is formed with a sheet material rolled into a cylindrical shape and welded at opposite ends thereof to form a weld joint, and said frame is fixedly secured in said barrel section of said casing with said weld joint on said barrel section disposed within a circumferential width of said communication passage so that entire periphery of said frame except for the portion where said communication passage is formed is in close contact with an inner peripheral surface of said barrel section of said casing.

2. A hermetic scroll compressor according to claim 1, wherein said frame is press-fitted in said barrel section of said casing.

3. A hermetic scroll compressor according to claim 1, wherein said discharge pipe is disposed at a position which substantially diametrically opposes to said weld joint and connected to said barrel section.

4. A hermetic scroll compressor according to claim 2, wherein said discharge pipe is disposed at a position which substantially diametrically opposes to said weld joint and connected to said barrel section.

* * * * *